(12) United States Patent
Wentworth et al.

(10) Patent No.: US 10,718,417 B2
(45) Date of Patent: Jul. 21, 2020

(54) TORQUE CONVERTER

(71) Applicants: Thomas F. Wentworth, Sterling Heights, MI (US); Gregory A Sbroglia, Farmington Hills, MI (US); Jeffrey M Orzechowski, Troy, MI (US)

(72) Inventors: Thomas F. Wentworth, Sterling Heights, MI (US); Gregory A Sbroglia, Farmington Hills, MI (US); Jeffrey M Orzechowski, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 120 days.

(21) Appl. No.: 16/146,255

(22) Filed: Sep. 28, 2018

(65) Prior Publication Data

US 2020/0103012 A1    Apr. 2, 2020

(51) Int. Cl.
*F16H 45/02* (2006.01)
*F16H 41/24* (2006.01)
*F16H 45/00* (2006.01)

(52) U.S. Cl.
CPC .......... *F16H 45/02* (2013.01); *F16H 41/24* (2013.01); *F16H 2041/246* (2013.01); *F16H 2045/002* (2013.01); *F16H 2045/005* (2013.01); *F16H 2045/0284* (2013.01)

(58) Field of Classification Search
CPC ......... F16H 2045/002; F16H 2045/005; F16H 2045/007
See application file for complete search history.

(56) References Cited

U.S. PATENT DOCUMENTS

| | | | | |
|---|---|---|---|---|
| 4,289,044 A | * | 9/1981 | Dorpmund | F16H 47/085 475/50 |
| 4,325,270 A | * | 4/1982 | McRae | F16H 45/02 475/44 |
| 4,773,283 A | * | 9/1988 | Dach | F16H 37/02 74/720 |
| 5,334,112 A | * | 8/1994 | Nogle | F16H 45/02 192/3.23 |
| 5,957,799 A | * | 9/1999 | Kashiwase | F16H 3/60 475/47 |
| 6,494,303 B1 | | 12/2002 | Reik et al. | |
| 8,939,859 B2 | | 1/2015 | Nagaraj et al. | |
| 9,441,720 B2 | | 9/2016 | Furcoiu | |
| 9,689,483 B2 | | 6/2017 | Rivera | |

* cited by examiner

*Primary Examiner* — Jacob S. Scott
(74) *Attorney, Agent, or Firm* — Ralph E Smith

(57) ABSTRACT

A torque converter for a vehicle includes an impeller, a turbine, a stator positioned between the impeller and the turbine, a one-way clutch coupled to the stator and configured to couple to a fixed member, and a controllable clutch assembly. The controllable clutch assembly is configured to selectively engage the stator and the turbine such that the stator is able to rotate with the turbine to facilitate preventing the stator from reacting against the one-way clutch and applying a load to the fixed member and thereby facilitating reducing an output of the torque converter and reducing engine vibration during idle, and disengage the stator from the turbine to enable relative rotation between the stator and turbine.

13 Claims, 2 Drawing Sheets

TORQUE CONVERTER

FIELD

The present disclosure relates generally to a torque converter and, more particularly, to a controllable clutch for providing an opposing torque to a turbine of a torque converter.

BACKGROUND

Typical centrifugal type torque converters for automotive and/or industrial transmission applications include an impeller, a stator and a turbine that cooperate using hydraulic fluid to transmit energy from an input (e.g., engine) to an output (e.g., transmission). In such a torque converter, the impeller is connected to the input, the turbine is connected to the output (e.g., transmission input shaft) and the stator is connected to a reaction member (e.g., non-rotating support shaft). The stator typically includes a plurality of blades designed to change the direction of the fluid exiting the turbine and entering the impeller. However, typical torque converters provide the greatest torque increase at zero output speed when the vehicle is in drive and the brakes prevent vehicle motion. With more fuel efficient engines having larger torque pulses due to firing, such pulses may be transmitted through the torque converter to the vehicle suspension and perceived as noise and vibration. Thus, while conventional torque converters do work well for their intended purpose, there remains a desire for improvement in the relevant art.

SUMMARY

In one example aspect, a torque converter for a vehicle is provided in accordance with the teachings of the present disclosure. In one exemplary implementation, the torque converter including an impeller, a turbine, a stator positioned between the impeller and the turbine, a one-way clutch coupled to the stator and configured to couple to a fixed member, and a controllable clutch assembly. The controllable clutch assembly is configured to selectively engage the stator and the turbine such that the stator is able to rotate with the turbine to facilitate preventing the stator from reacting against the one-way clutch and applying a load to the fixed member and thereby facilitating reducing an output of the torque converter and reducing engine vibration during idle, and disengage the stator from the turbine to enable relative rotation between the stator and turbine.

In addition to the foregoing, the described torque converter may include one or more of the following features: wherein the controllable clutch assembly is a multi-plate clutch pack formed of intermeshed first and second friction discs; wherein the first friction discs are coupled to the stator and the second friction discs are coupled to the turbine; wherein the fixed member is a transmission case; a controller configured to selectively engage the controllable clutch assembly; wherein the controller is programmed to determine if the vehicle is coasting or braking, and engage the controllable clutch assembly if the vehicle is determined to be coasting or braking.

In addition to the foregoing, the described torque converter may include one or more of the following features: wherein the controller is further programmed to determine if an engine of the vehicle is running and the vehicle is at idle, and engage the controllable clutch assembly if the vehicle is determined to be at idle; wherein the controller is further programmed to determine if there is a request for vehicle acceleration, and disengage the controllable clutch assembly if it is determined there is a request for vehicle acceleration, to thereby allow fluid pressure acting on the stator to engage a one-way clutch and provide torque multiplication; and wherein the controller is further programmed to determine if an engine of the vehicle is off, and maintain a reservoir of fluid pressure to maintain engagement of the controllable clutch assembly if the vehicle engine is determined to be off.

In another example aspect, a method of controlling a torque converter for a vehicle is provided in accordance with the teachings of the present disclosure. In one exemplary implementation, the torque converter includes an impeller, a turbine, a stator, a one-way clutch coupled to the stator and a fixed member, and a controllable clutch assembly configured to selectively engage the stator and the turbine such that the stator is able to rotate with the turbine to facilitate preventing the stator from reacting against the one-way clutch and applying a load to the fixed member and thereby facilitating reducing an output of the torque converter and reducing engine vibration during idle, and selectively disengage the stator from the turbine allowing the stator to react through the one-way clutch against the fixed member and enable relative rotation between the stator and turbine. The method includes determining if the vehicle is coasting or braking, and engaging the controllable clutch assembly if the vehicle is determined to be coasting or braking.

In addition to the foregoing, the described method may include one or more of the following features: determining if an engine of the vehicle is running and the vehicle is at idle, and engaging the controllable clutch assembly if the vehicle is determined to be at idle; determining if there is a request for vehicle acceleration, and disengaging the controllable clutch assembly if it is determined there is a request for vehicle acceleration, to thereby allow fluid pressure acting on the stator to engage a one-way clutch and provide torque multiplication; and determining if an engine of the vehicle is off, and maintaining a reservoir of fluid pressure to maintain engagement of the controllable clutch assembly if the vehicle engine is determined to be off.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
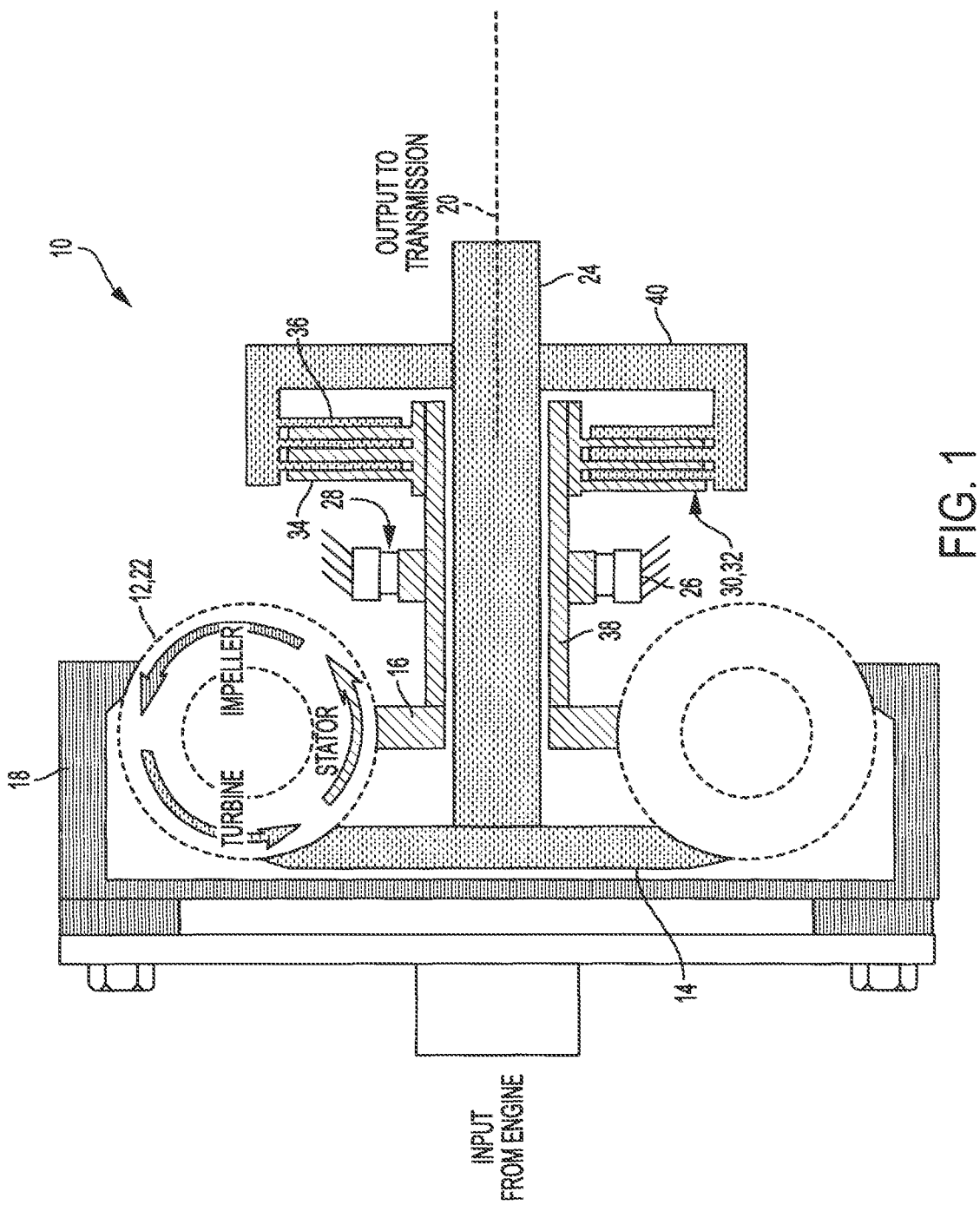
FIG. 1 is a schematic view of an example torque converter having an example controllable clutch according to the principles of the present disclosure.

With initial reference to FIG. 1, an exemplary torque converter is shown and generally identified at reference numeral 10. As shown, the torque converter 10 is a centrifugal type torque converter that includes an impeller 12, a turbine 14 and a stator 16. In one exemplary implementation, the torque converter includes a casing or housing 18 that is coupled to an engine or other torque generating device (not shown) to be rotationally driven by the engine about a central axis 20. The housing 18 of the torque converter 10 includes a wall 22 to which are coupled a series of fins or vanes (not shown) that function as the pump or impeller 12 for hydraulic fluid (e.g., transmission oil). Inside the housing 18 is the turbine 14, which includes fins or blades (not shown). The turbine 14 is typically coupled to a transmission (not shown), such as via an output shaft 24. As the fluid is directed from the impeller 12 through its action as a centrifugal pump, the fluid enters the blades of turbine 14 causing it to spin or rotate, which in turn causes the transmission input (e.g., output shaft 24) to the transmission to rotate.

The hydraulic fluid exits the turbine 14 at or near its center typically moving in an axial direction. Upon exiting the turbine 14, the fluid interacts with the stator 16, which includes a plurality of blades (not shown) configured to redirect the flow of hydraulic fluid from the turbine 14 back to the impeller 12 generally in a direction of the already spinning impeller 12. Fluid is redirected as a result of it forcing engagement of a one-way clutch 28 reacting against a fixed member 26 (e.g., the transmission case). In some embodiments, the output torque to the transmission is the sum of the input torque from the impeller 12 and the equal and opposite torque reacted by the stator 16 through the locked one-way clutch 28 against the fixed member 26. In addition, the redirected fluid also supplements the input torque assisting vehicle take-off or acceleration.

In such operating conditions, such as up to a coupling point of the torque converter 10 (e.g., when impeller and turbine are spinning at close to the same speed and typically when a lockup clutch between impeller and turbine would be applied), the stator blades are configured to redirect the hydraulic fluid (by reacting torque through the stator one-way clutch 28) exiting the turbine 14 before it interacts with the impeller 12 so that the returning fluid will not slow down the impeller 12 and work against the engine. The stator 16 resides at or near the center of the torque converter 10 and is coupled to a fixed member 26 such as, for example, the transmission case or a fixed transmission support shaft. In one exemplary implementation, a one-way clutch 28 couples the stator 16 to the fixed member 26, preventing the stator 16 from turning in one direction, but not the other.

Accordingly, as the hydraulic fluid exits the turbine 14 almost axially and interacts or hits the pressure side of the stator blades, the one-way clutch 28 prevents rotation of stator 16 and the stator blades divert the fluid in the same direction as the rotation of impeller 12 due to the stationary position of the stator 16, thereby increasing output torque (e.g., as the vehicle speeds up). As the vehicle speed increases and the speed of turbine 14 increases, the fluid exits the turbine less axially (e.g., more inclined) and hits the stator blades at a different portion and causes the stator 16 to rotate in the allowed direction (e.g., in the same direction as impeller 12 and turbine 14). Thus, the stator 16 provides increased torque during vehicle acceleration until the speed of turbine 14 reaches near that of impeller 12, which is typically when a lock-up clutch (not shown) is utilized to mechanically lock the turbine 14 with the impeller 12 to facilitate eliminating energy loss due to fluid friction.

In the example embodiment, torque converter 10 includes a controllable clutch assembly 30 that, when activated, facilitates preventing transfer of the torque reacted by the case through the locked stator 16 and instead applies it as an opposing torque to the turbine 14 and output shaft 24. Accordingly, controllable clutch assembly 30 facilitates preventing stator 16 from locking to fixed member 26 (via one-way clutch 28) and instead couples stator 16 to turbine 14 for common rotation therewith and resulting in the torque which previously was reacted against the fixed member 26 through one-way clutch 28 to remain internal to the coupled stator and turbine assembly. As a result, in the example operation, output torque is significantly reduced to a degree greater than what would result from a clutch that simply releases the stator applying torque to the fixed member 26. When controllable clutch assembly 30 is deactivated (released), the function of the stator 16 returns to normal, thereby allowing the turbine output fluid force to be redirected by the locked stator 16 into the impeller 12 to increase the output torque of the torque converter 10.

In the example implementation, controllable clutch assembly 30 is controlled via a controller 60 such as, for example, an ECU. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In the example embodiment, controllable clutch assembly 30 is a multi-plate clutch pack 32 formed of intermeshed, alternating first and second frictions discs 34, 36. Clutch pack 32 includes at least one friction disc 34 and at least one friction disc 36. The first friction discs 34 are externally coupled (e.g., splined) to a hub 38 of stator 16, and the second friction discs 36 are internally coupled (e.g., splined) to a hub 40 of output shaft 24. When controllable clutch assembly 30 is disengaged (deactivated), the first friction discs 34 rotate freely between the second friction discs 36. When controllable clutch assembly 30 is engaged (activated), for example through a hydraulic piston (not shown), the first friction discs 34 frictionally engage the second friction discs 36 and stator 16 applies an opposing torque to the rotating turbine 14, thereby reducing the output torque delivered through the transmission to the vehicle suspension and significantly reducing torque pulse disturbances. This in turn reduces idle vibration perceived by the vehicle occupants as well as reduces the amount of braking required to oppose engine idling when the vehicle is stopped. Although described as a multi-plate clutch pack, it will be appreciated controllable clutch assembly 30 can be any suitable clutch assembly that enables torque converter 10 to function as described herein.

Figure 2:
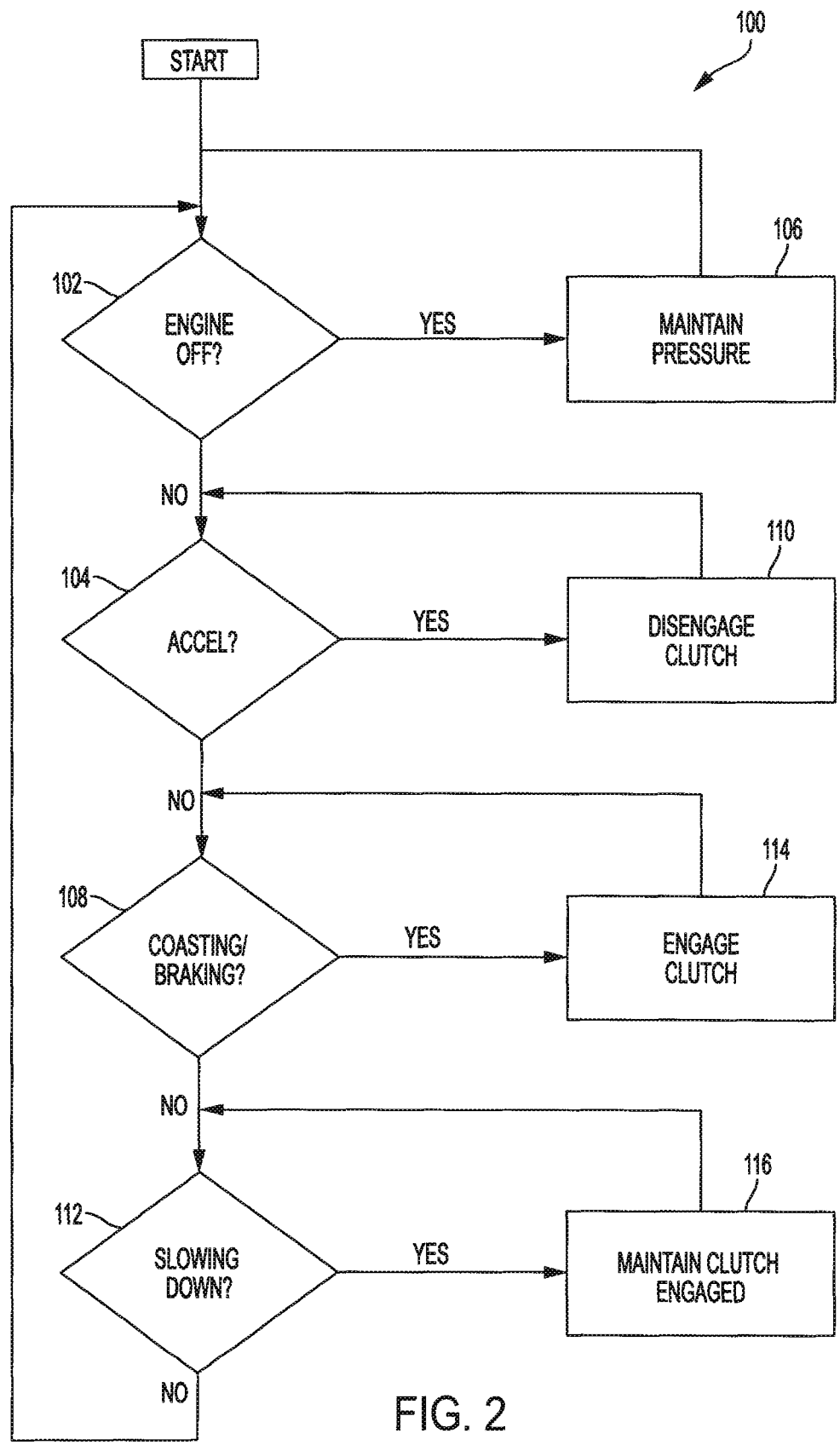
FIG. 2 is a flow diagram of an example method of controlling the torque converter shown in FIG. 1, in accordance with the principles of the present disclosure.

FIG. 2 illustrates an example method 100 of controlling torque converter 10. In the example embodiment, method 100 begins at step 102 where controller 60 determines if the vehicle engine is off. If no, control proceeds to step 104. If yes, at step 106, controller 60 maintains a reservoir of fluid pressure to keep the clutch assembly 30 engaged when a transmission pump (not shown) is not supplying line pressure, which occurs when the engine is off. This enables reduced torque output from torque converter 10 to the transmission to be in effect when the vehicle is started. This reduction of torque output to the transmission when the vehicle is started reduces or prevents disturbances that may result in idle vibration, and reduces the braking force required to maintain the vehicle in a stationary position when the vehicle is first shifted into Drive. Control then returns to step 102.

At step 104, controller 60 determines if a request for acceleration is requested, for example, by a driver pushing on an accelerator pedal (not shown). If no, control proceeds to step 108. If yes, at step 110, controller 60 disengages clutch assembly 30 to thereby allow the fluid pressure acting on stator 16 to engage the one-way clutch 28 and react force against the fixed member 26. This results in the typical torque multiplication desired to accelerate the vehicle. Control then returns to step 104.

At step 108, controller 60 determines if the vehicle is coasting or braking. If no, control proceeds to step 112. If yes, at step 114, controller 60 engages clutch assembly 30 when the impeller 12 and turbine 14 are rotating at close enough speeds such that the one-way clutch 28 is spinning in the overrunning direction of rotation and not supplying any load to the fixed member 26, which occurs when the vehicle is coasting or braking. As such, engaging clutch assembly 30 effectively couples the turbine 14 and stator 16 for common rotation.

At step 112, controller 60 determines if the vehicle is idling in drive or slowing down (e.g., release of the accelerator pedal, or a combination of releasing the accelerator pedal and braking). If no, control returns to step 102. If yes, at step 116, controller 60 maintains engagement of clutch assembly 30 to prevent the stator 16 from reacting against the overrunning one-way clutch 28 and applying load to the fixed member 26 (e.g., transmission case). The torque converter fluid from the turbine blades on the stator blades is then reacted internally in the engaged turbine/stator and thus not reacted by the fixed member 26. As a result, the turbine output torque is reduced, thereby reducing the torque applied to the drive shaft (not shown), and reducing torque fluctuations from engine firing. This reduces the braking force required to maintain the vehicle stations, and also reduces torque fluctuations transmitted to the vehicle body, which may result in noticeable vibration to vehicle occupants.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A torque converter for a vehicle, the torque converter comprising:
    an impeller;
    a turbine;
    a stator positioned between the impeller and the turbine;
    a one-way clutch coupled to the stator and configured to couple to a fixed member; and
    a controllable clutch assembly configured to:
        selectively engage the stator and the turbine such that the stator is able to rotate with the turbine to facilitate preventing the stator from reacting against the one-way clutch and applying a load to the fixed member and applying it instead as an opposing torque to the turbine and an output of the torque converter, thereby facilitating reducing the output of the torque converter and reducing engine vibration during idle; and
        disengage the stator from the turbine to enable relative rotation between the stator and turbine thereby allowing fluid pressure acting on the stator to engage the one-way clutch and provide torque multiplication.

2. The torque converter of claim 1, wherein the fixed member is a transmission case.

3. The torque converter of claim 1, further comprising a controller in communication with the clutch assembly and configured to selectively engage the clutch assembly.

4. The torque converter of claim 3, wherein the controller is programmed to:
    determine if the vehicle is coasting or braking; and
    engage the controllable clutch assembly if the vehicle is determined to be coasting or braking.

5. The torque converter of claim 4, wherein the controller is further programmed to:
    determine if an engine of the vehicle is running and the vehicle is at idle; and
    engage the controllable clutch assembly if the vehicle is determined to be at idle.

6. The torque converter of claim 4, wherein the controller is further programmed to:
    determine if there is a request for vehicle acceleration; and
    disengage the controllable clutch assembly if it is determined there is a request for vehicle acceleration, to thereby allow fluid pressure acting on the stator to engage the one-way clutch and provide torque multiplication.

7. The torque converter of claim 4, wherein the controller is further programmed to:
    determine if an engine of the vehicle is off; and
    maintain a reservoir of fluid pressure to maintain engagement of the controllable clutch assembly if the vehicle engine is determined to be off.

8. The torque converter of claim 1, wherein the controllable clutch assembly is a multi-plate clutch pack formed of intermeshed first and second friction discs.

9. The torque converter of claim 8, wherein the first friction discs are coupled to the stator and the second friction discs are coupled to the turbine.

10. A method of operating a torque converter for a vehicle, the torque converter having an impeller, a turbine, a stator, and a one-way clutch coupled to the stator and a fixed member, the method comprising:
    determining if the vehicle is coasting or braking; and
    engaging a controllable clutch assembly if the vehicle is determined to be coasting or braking, the controllable clutch assembly configured to selectively engage the stator and the turbine such that the stator is able to rotate with the turbine to facilitate preventing the stator from reacting against the one-way clutch and applying a load to the fixed member and thereby facilitating reducing an output of the torque converter and reducing engine vibration during idle, and selectively disengage the stator from the turbine allowing the stator to react through the one-way clutch against the fixed member and enable relative rotation between the stator and turbine.

11. The method of claim 10, further comprising:
    determining if an engine of the vehicle is running and the vehicle is at idle; and
    engaging the controllable clutch assembly if the vehicle is determined to be at idle.

12. The method of claim 10, further comprising:
    determining if there is a request for vehicle acceleration; and
    disengaging the controllable clutch assembly if it is determined there is a request for vehicle acceleration, to thereby allow fluid pressure acting on the stator to engage a one-way clutch and provide torque multiplication.

13. The method of claim 10, further comprising:
determining if an engine of the vehicle is off; and
maintaining a reservoir of fluid pressure to maintain engagement of the controllable clutch assembly if the vehicle engine is determined to be off.

\* \* \* \* \*